US006276725B1

(12) United States Patent
Laurash et al.

(10) Patent No.: US 6,276,725 B1
(45) Date of Patent: Aug. 21, 2001

(54) AUTOMATION FRIENDLY SECURITY LABELS FOR SPECIMEN CONTAINER

(75) Inventors: David F. Laurash, Bellbrook; Sherry L. Bannister, Kettering, both of OH (US); David Dwyer, Atlanta, GA (US); Peter J. Sagona, Pottstown, PA (US)

(73) Assignee: The Standard Register Company, Dayton, OH (US)

( * ) Notice: Subject to any disclaimer, the term of this patent is extended or adjusted under 35 U.S.C. 154(b) by 0 days.

(21) Appl. No.: 09/289,354

(22) Filed: Apr. 9, 1999

(51) Int. Cl.[7] ................................ B32B 9/00; B28B 3/02

(52) U.S. Cl. ............................. 283/81; 283/98; 206/459; 206/460; 40/299; 40/306; 40/311; 40/313; 40/638; 40/642

(58) Field of Search ........................ 283/81, 98; 206/459, 206/460; 40/299, 306, 311, 313, 638, 642

(56) References Cited

U.S. PATENT DOCUMENTS

| | | | | |
|---|---|---|---|---|
| D. 306,314 | | 2/1990 | Jessamine et al. . | |
| 1,827,636 | * | 10/1931 | Ames | 283/81 |
| 5,203,851 | * | 4/1993 | Browning et al. | 283/81 |
| 5,217,307 | * | 6/1993 | McClintock | 206/460 |
| 5,399,405 | * | 3/1995 | Rennels, Jr. et al. | 283/103 |
| 5,601,314 | * | 2/1997 | Burns et al. | 283/81 |
| 5,792,536 | * | 8/1998 | Whipp | 283/98 |
| 6,146,729 | * | 11/2000 | Nihda | 283/81 |

FOREIGN PATENT DOCUMENTS

| | | |
|---|---|---|
| 2102734 | 1/1995 | (CA) . |
| 2229971 | 11/1998 | (CA) . |
| 27 53 239 | 6/1979 | (DE) . |
| 295 18 961 U1 | 5/1997 | (DE) . |
| 07165889 | 1/1997 | (JP) . |

* cited by examiner

*Primary Examiner*—A. L. Wellington
*Assistant Examiner*—Mark Henderson
(74) *Attorney, Agent, or Firm*—Killworth, Gottman, Hagan & Schaeff LLP

(57) ABSTRACT

A security label for a specimen container comprising a generally elongated strip of label material having a plurality of lines of perforations is disclosed. Also disclosed is a security label for a specimen container having a line of perforations. The line or lines of perforations of the disclosed invention extend across the width of the generally elongated strip of label material. A method of securing a specimen container is also disclosed. The method disclosed involves providing a security label comprising a generally elongated strip of label material defining a first surface and a second surface. A plurality of lines of perforations extend across the width of the generally elongated strip of label material. The security label is then adhered to a specimen container so that the center portion of the security label is aligned with the lid of a specimen container.

4 Claims, 7 Drawing Sheets

AUTOMATION FRIENDLY SECURITY LABELS FOR SPECIMEN CONTAINER

BACKGROUND

1. Technical Field

The present invention is directed toward a security label for a specimen container, toward a security label for a specimen container having a plurality of lines of perforations, toward a security label for a specimen container having single lines of perforations and toward a method for securing a specimen container.

2. Background of the Invention

Only a few years ago, the practice of testing individuals for the use of controlled substances was confined to athletes and those operating dangerous equipment. In today's society, however, drug testing is commonly carried out on a variety of individuals. More often then not, employers require prospective employees to undergo, and pass, drug tests before an individual can begin working with that employer. Additionally, employers often randomly drug test their employees to ensure that the work place is a drug free environment. Thus, with such high importance placed on the results of drug testing, it is imperative that samples sent to laboratories for testing be secure and tamper proof.

Typically, an individual required to undergo a test for controlled substances is sent to a facility where a specimen, such as urine, is collected. Strict security procedures are followed during the specimen collection process to ensure that the specimen sample is not tampered with or contaminated. Such security procedures are vital to the integrity of the testing process, as a sample that is tampered with may yield negative results when indeed the person being tested is under the influence of a controlled substance. On the other hand, contaminated samples may yield positive results when in fact the person being tested is not under the influence of a controlled substance. Such "false positive" results could have devastating personal and professional effects on the individual undergoing the testing.

In general, in order to maintain the integrity of the specimen sample, it is common practice to seal laboratory specimen containers with a security label. Such a security label is typically placed over the cap of the specimen container and extends down the sides of the container, thereby sealing the container and its contents. The container, with its contents secured therein, is then sent to a laboratory testing facility. Any attempt to access the specimen after the security label is affixed to the container will result in a torn security label. A torn security label is evidence to the laboratory testing facility that the specimen has either been tampered with or is contaminated. A tampered or contaminated specimen will not be tested by the laboratory.

At some laboratory testing facilities a laboratory technician manually tests each specimen contained in a specimen container. In order to access the specimen to be tested, the laboratory technician breaks the security label seal affixed to the specimen container, either physically or with a sharp object, and then opens the lid of the specimen container. There exists a need to provide a security label for a specimen container which, by sealing the specimen container, maintains the integrity of the specimen sample by indicating if the specimen has been tampered with, and which also provides a seal on the specimen container such that the specimen container can be opened without the need to apply a substantially greater force than would be exerted to open a specimen container which did not contain an affixed security label.

The practice of manually breaking the security label seal, opening the specimen container and manually testing the specimen is a time consuming and costly task. In order to reduce the time and costs involved with such manual testing procedures, present day laboratory testing facilities have implemented automated testing procedures of specimen samples. An important feature of testing a specimen with an automated process is the mechanical removal of the lid of the specimen container. The force needed to open an unsealed specimen container is fairly consistent from one container to the next. However, the force needed to open a specimen container sealed with a security label can be inconsistent from one container to the next. This inconsistency creates a number of problems for automated testing processes. Non-opening of containers and spring ups (which can splash out the container's contents thereby causing contamination of other nearby samples or exposing personnel to biohazards), are just two examples of such problems. Additionally, if the automated system does not cleanly break the security label affixed to the container, adhesive is then exposed. Exposed adhesive can attach to adjacent specimen containers causing contamination, or it can attach to processing equipment, resulting in equipment malfunction and other related problems.

In order to reduce the possibility of the aforementioned problems occurring during automated testing, some laboratories will employ manual labor to precut the security labels affixed to the specimen containers before the containers are opened by the automated testing process. While this practice reduces the likelihood of non-opened containers and spring ups, it also results in increased manual labor which, in turn, increases the overall cost of testing the specimen. There exists a need to provide a security label for a specimen container which, by sealing the specimen container, maintains the integrity of the specimen sample by indicating if the specimen has been tampered with, and which also provides a seal on the specimen container such that the specimen container can be opened by an automated testing process with a force which is fairly consistent among each specimen container affixed with the same type of security label.

BACKGROUND ART

Tamper evident seals are known in the art. One such tamper evident closure seal is disclosed in U.S. Pat. No. 5,718, 859. The tamper evident seals made by this claimed method comprise a plurality of slits which increase the likelihood that the seal will be destroyed if such seal is removed from a container to which it is attached. The configuration of the slits is such, however, that the seal remains in tact when it is removed from a release liner portion prior to its application to a container. The tamper evident closure seal comprises relatively thin strip sections. After this tamper evident closure seal is placed on a container, an attempt to remove the lid of the container will result in tearing at the thin strip sections. One drawback of the seal of the '859 patent is that a force greater than desired may be required to break the seal to gain access to the specimen contained in the specimen container. The present invention overcomes this problem.

SUMMARY OF THE INVENTION

In one aspect of the present invention, a security label is provided comprising a generally elongated strip of label material defining a first surface and a second surface. The generally elongated strip of label material is delineated into a first end portion, a center portion, and a second end portion. The center portion is situated between the first end portion and the second end portion. A plurality of lines of perforations extend across the width of either the first end portion where the first end portion lies adjacent the center portion or across the width of the second end portion where the second end portion lies adjacent the center portion, or across both.

In a preferred form of this aspect of the present invention, the generally elongated strip of label material is paper. The strip has a coating of adhesive on its second surface, such adhesive preferably being a pressure sensitive adhesive. The first end portion and the second end portion of the generally elongated security label both contain a plurality of slits. The lines of perforations are closely spaced in relation to one another. The distance between lines of perforations of two adjacent lines of perforations is typically from about 1/32 of an inch to about 1/4 of an inch; preferably about 1/16 of an inch, and more preferably about 1/8 of an inch. In another preferred form of this aspect of the present invention, a coating of adhesive is not present on the second surface of the generally elongated strip of label material in the area defined by the plurality of lines of perforations.

In another aspect of the present invention, a security label for a specimen container is provided comprising a generally elongated strip of label material defining a first surface and a second surface. The generally elongated strip of label material is delineated into a first end portion, a center portion, and a second end portion. The center portion is situated between the first end portion and the second end portion. A line of perforations extends across the width of either the first end portion where the first end portion lies adjacent the center portion or across the width of the second end portion where the second end portion lies adjacent the center portion, or across both.

In a preferred form of this aspect of the present invention, the generally elongated strip of label material is paper. The second surface of the generally elongated strip of label material comprises a coating of adhesive, such adhesive preferably being a pressure sensitive adhesive. In another preferred form of this aspect of the present invention, a coating of adhesive is not present on the second surface of the generally elongated strip of label material in the area defined by the line of perforations.

In another aspect of the present invention a security label is provided comprising: a release liner defining a first face and a second face; a generally elongated strip of label material defining a first surface and a second surface, substantially the entirety of the second surface of the generally elongated strip of label material being removably adhered to the first face of the release liner; the generally elongated strip of label material being delineated into a first end portion, a center portion, and a second end portion; the center portion of said generally elongated strip of label material situated between the first end portion and the second end portion of said generally elongated strip of label material; said generally elongated strip of label material having a plurality of lines of perforations extending across the width of either the first end portion where the first end portion lies adjacent the center portion or across the width of the second end portion where the second end portion lies adjacent the center portion, or across both. The generally elongated strip of label material has die cuts therein to define one or more security labels.

In a preferred form of this aspect of the present invention, the generally elongated strip of label material is paper. The second surface of the generally elongated strip of label material comprises a coating of adhesive, such adhesive preferably being a pressure sensitive adhesive. The generally elongated strip of label material is die cut along its length, thereby defining one or more generally elongated security labels and across its width thereby defining one or more generally rectangular security labels. The lines of perforations are closely spaced in relation to one another. The distance between lines of perforations of two adjacent lines of perforations is typically from about 1/32 of an inch to about 1/4 of an inch; preferably about 1/16 of an inch, and more preferably about 1/8 of an inch. In another preferred form of this aspect of the present invention, a coating of adhesive is not present on the second surface of the generally elongated strip of label material in the area defined by the plurality of lines of perforations.

In yet another preferred form of this aspect of the present invention, printed information is provided on both the generally elongated security label and on the generally rectangular security label. Processes for printing information on security labels are known in the art. Conventionally, labels may be printed by printing presses with repetitive indicia on one or more of the label surfaces. Labels may also be conventionally imprinted with non-repetitive, variable information from one label to the next, via impact printers or non-impact printers, including laser, ink jet, thermal, ion deposition, or magnetography. In addition to the above printing methods, the security labels are also preferably adapted for receiving handwritten indicia.

In one other preferred form of this aspect of the present invention, the first end portion and the second end portion of the generally elongated security label both contain a plurality of slits. Die cuts in the center portion of the generally elongated strip of label material define a shape which is partially rounded, having straight parallel edges along the length. The width of the generally elongated strip of label material in the area defined by the plurality of lines of perforations is substantially less than the width of the first and second end portions of the generally elongated security label. The width of the generally elongated strip of label material in the area defined by the plurality of lines of perforations is less than the width of the center portion of the generally elongated strip of label material. In still another preferred form of this aspect of the present invention, the second face of the release liner comprises a coating of adhesive which is adhered to a business form.

In another aspect of the present invention, a method is provided for securing a specimen container, the container including a container body defining a container mouth and a container lid which connects the container lid to the container mouth to close the container mouth, comprising the steps of: a) providing a security label comprising a generally elongated strip of label material defining a first surface and a second surface; delineating the generally elongated strip of label material into a first end portion, a center portion and a second end portion, wherein the center portion is situated between the first end portion and the second end portion; providing a plurality of lines of perforations extending across the width of either said first end portion where said first end portion lies adjacent the center potion or across the width of the second end portion where the second end portion lies adjacent the center portion, or across both; and b) adhering the security label to a specimen container so that the center portion of the security label is aligned with the lid of the specimen container. In a preferred form of this aspect of the present invention, die cuts are provided across the width of the generally elongated strip of label material, thereby defining a generally rectangular security label. The generally rectangular security label can be secured to a means for transporting the specimen container for the purpose of securing the transportation means in a closed position, thereby maintaining the integrity of the contents contained inside the specimen container. Transportation means for the specimen container may include all types of containers made of paper, corrugated fiber, plastic or the like, business folders, business envelopes, or other like containment structures.

DETAILED DESCRIPTION OF THE PREFERRED EMBODIMENT

Figure 2:
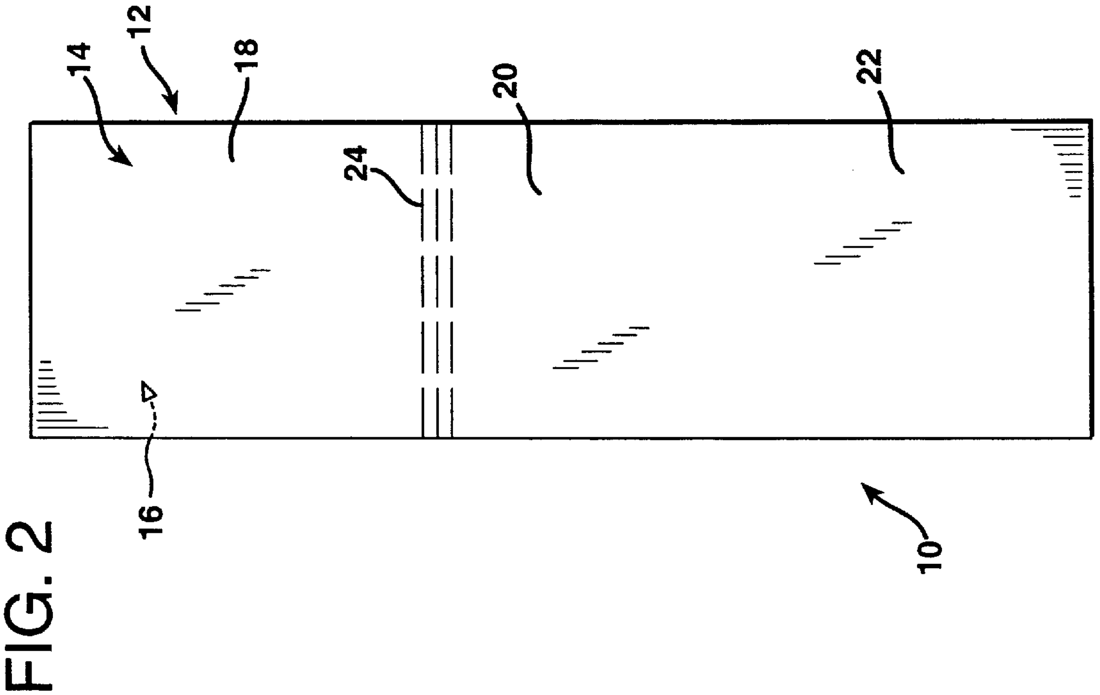
FIG. 2 is a plan view of a security label embodying another preferred embodiment of the present invention.
Figure 1:
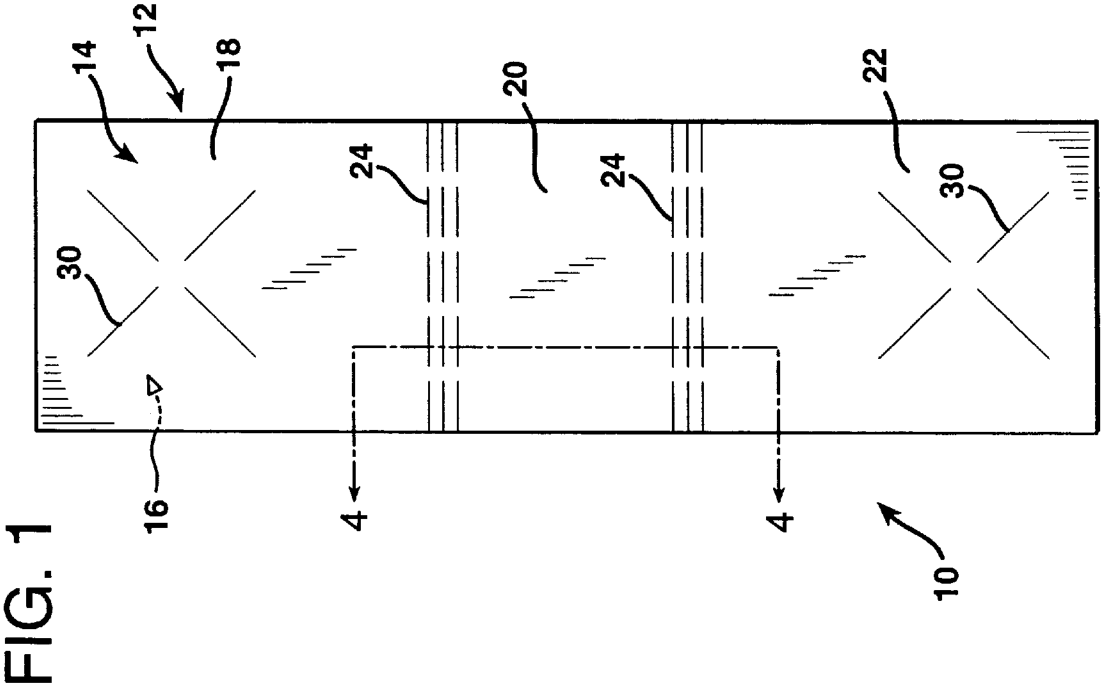
FIG 1 is a plan view of a security label embodying a preferred embodiment of the present invention.
Figure 3:
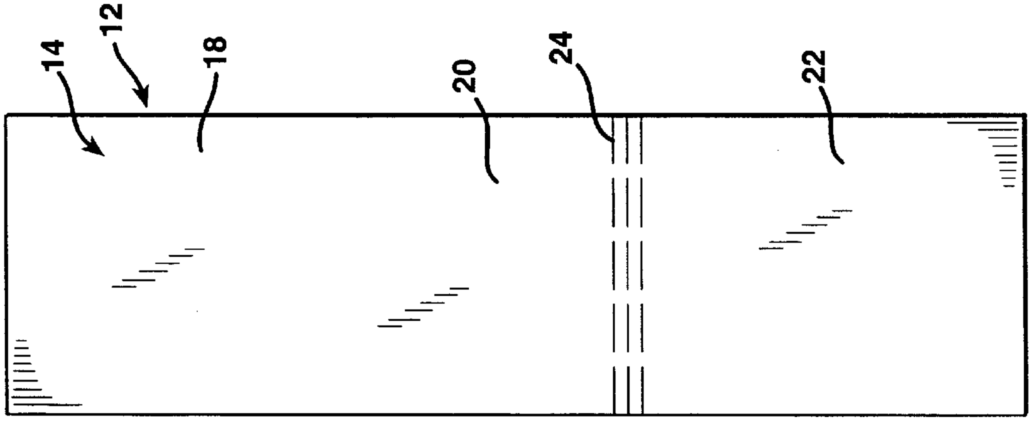
FIG. 3 is a plan view of a security label embodying another preferred embodiment of the present invention.

A security label 10 made according to the present invention is shown in FIG. 1. The security label 10 includes a generally elongated strip of label material 12 defining a first surface 14 and a second surface 16. As is generally known in the art, any label material may be used. In one preferred structure, the generally elongated strip of label material is paper. The generally elongated strip of label material 12 is delineated into a first end portion 18, a center portion 20 and a second end portion 22. The center portion 20 is situated between the first end portion 18 and the second end portion 22. A plurality of lines of perforations 24 extend across the width of the first end portion 18 where the first end portion 18 lies adjacent the center portion 20 and across the width of the second end portion 22 where the second end portion 22 lies adjacent the center portion 20. Alternatively, the plurality of lines of perforations 24 extend across the width of either the first end portion 18 where the first end portion 18 lies adjacent the center portion 20 (See FIG. 2) or across the width of the second end portion 22 where the second portion 22 lies adjacent the center portion 20 (See FIG. 3).

Figure 4:
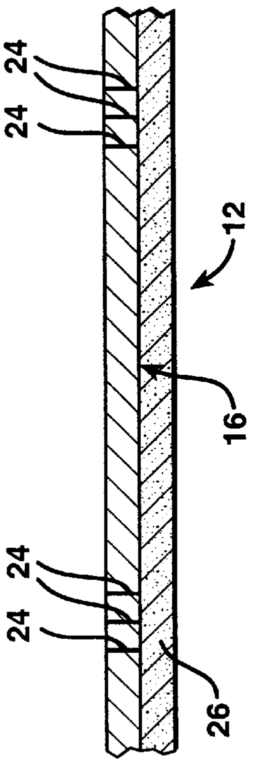
FIG. 4 is a cross-sectional view taken along lines 4—4 of FIG. 1.
Figure 5:
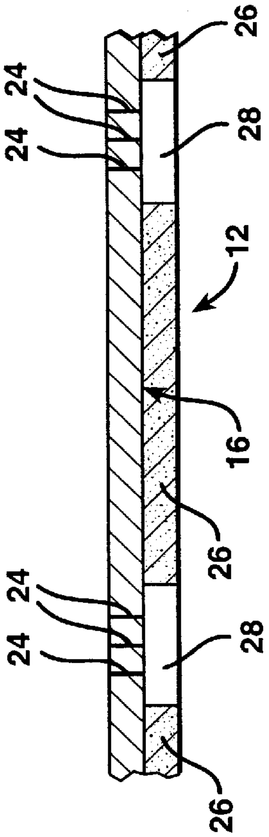
FIG. 5 is a cross-sectional view taken along lines 4—4 of FIG. 1, with a zone of no adhesive in the area defined by the plurality of lines of perforations.

In one preferred structure, a coating of adhesive 26 (See FIG. 4) is applied to the second surface 16 of the generally elongated strip of label material 12. The adhesive 26 is preferably a pressure sensitive adhesive suitable for adhering the second surface 16 of the generally elongated strip of label material 12. In another preferred structure, the coating of adhesive 26 (See FIG. 5) is not present in the area defined by the plurality of lines of perforations 24, thereby defining a no adhesive zone 28. A plurality of slits 30 are cut into the first end portion 18 and the second end portion 22 of the generally elongated strip of label material 12.

Figure 7:
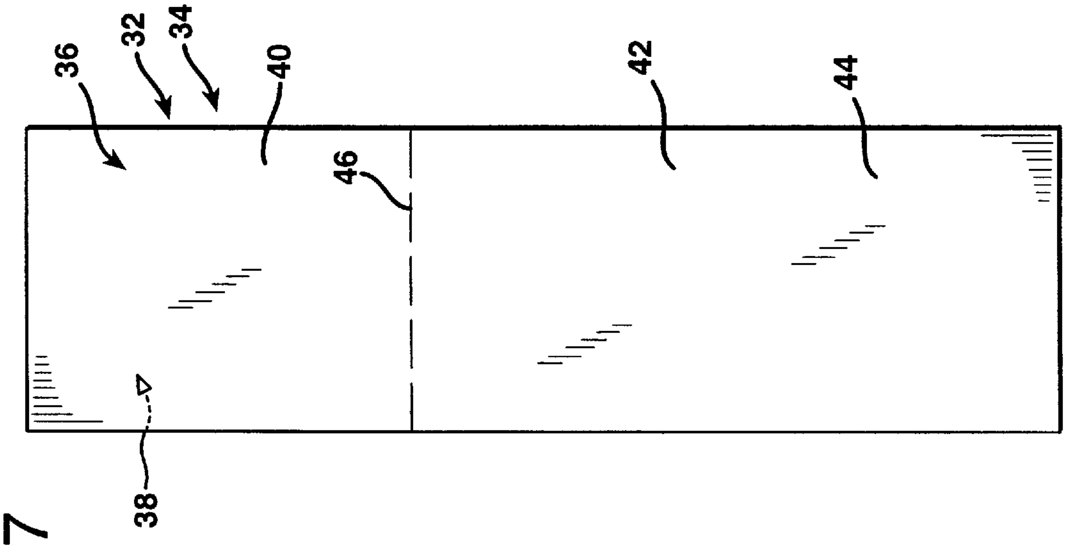
FIG. 7 is a plan view of a security label embodying another preferred embodiment of the present invention.
Figure 6:
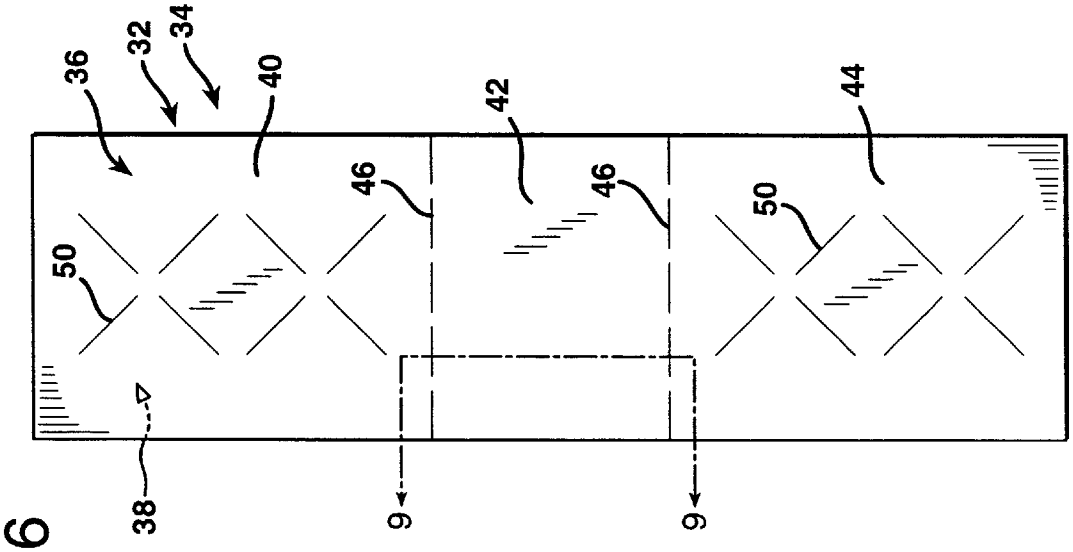
FIG. 6 is a plan view of a security label embodying another preferred embodiment of the present invention.
Figure 8:
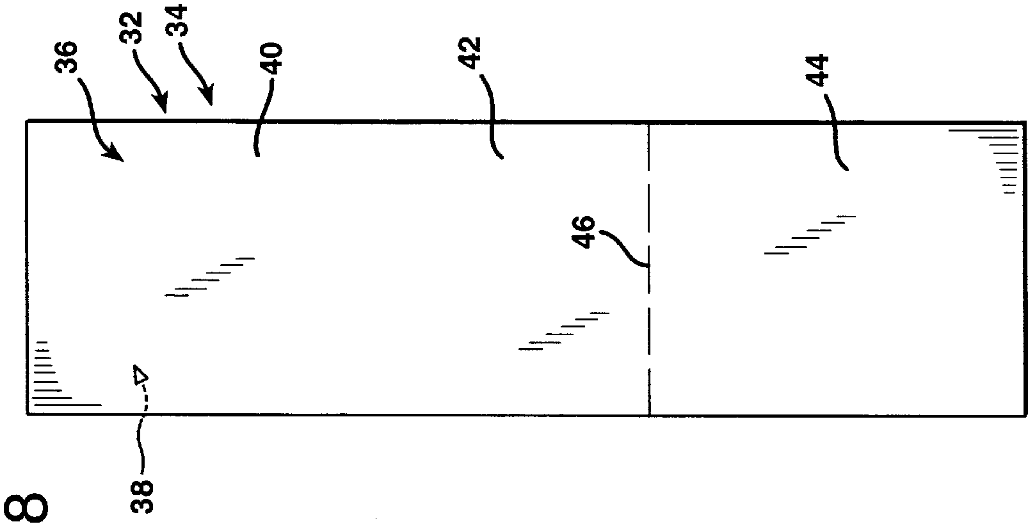
FIG. 8 is a plan view of a security label embodying another preferred embodiment of the present invention.

A security label 32 made according to the present invention is shown in FIG. 6. The security label 32 includes a generally elongated strip of label material 34 defining a first surface 36 and a second surface 38. As is generally known in the art, any label material may be used. In one preferred structure, the generally elongated strip of label material is paper. The generally elongated strip of label material 34 is delineated into a first end portion 40, a center portion 42 and a second end portion 44. The center portion 42 is situated between the first end portion 40 and the second end portion 44. A line of perforations 46 extends across the width of the first end portion 40 where the first end portion 40 lies adjacent the center portion 42 and across the width of the second end portion 44 where the second end portion 44 lies adjacent the center portion 42. Alternatively, the line of perforations 46 extends across the width of either the first end portion 40 where the first end portion 40 lies adjacent the center portion 42 (See FIG. 7) or across the width of the second end portion 44 where the second portion 44 lies adjacent the center portion 42 (See FIG. 8).

Figure 9:
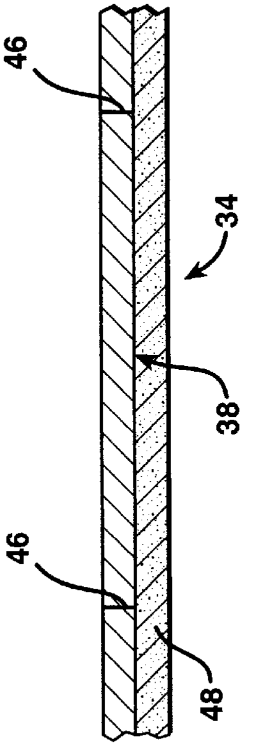
FIG. 9 is a cross-sectional view taken along lines 9—9 of FIG. 6.
Figure 10:
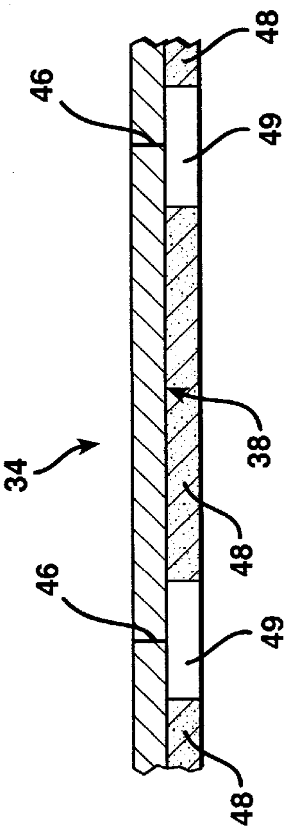
FIG. 10 is a cross-sectional view taken along lines 9—9 of FIG. 6, with a zone of no adhesive in the area defined by the line of perforations.

In one preferred structure, a coating of adhesive 48 (See FIG. 9) is applied to the second surface 38 of the generally elongated strip of label material 34. The adhesive 48 is preferably a pressure sensitive adhesive suitable for adhering the second surface 38 of the generally elongated strip of label material 34. In another preferred structure, a coating of adhesive 48 (See FIG. 10) is not present in the area defined by the line of perforations 46, thereby defining a no adhesive zone 49. A plurality of slits 50 are cut into the first end portion 40 and the second end portion 44 of the generally elongated strip of label material 34.

Figure 11:
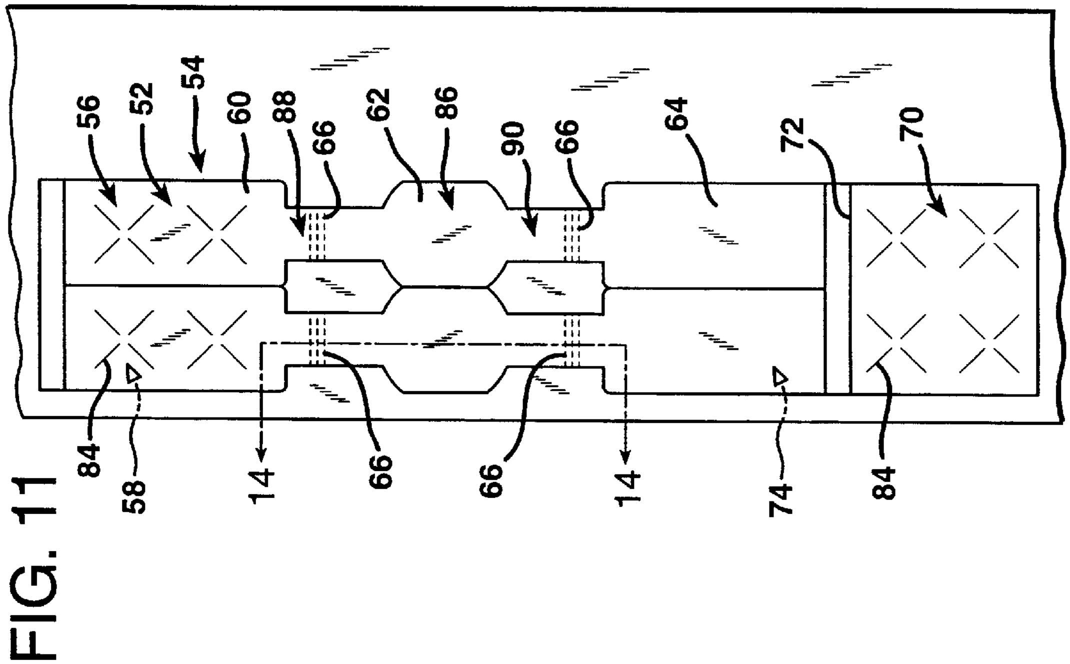
FIG. 11 is a plan view of a security label embodying another preferred embodiment of the present invention.

A security label according to another embodiment of the present invention is depicted in FIG. 11. The arrangement includes a pair of generally elongated security labels, each pair designated 52. Each security label 52 includes a generally elongated strip of label material 54 defining a first surface 56 and a second surface 58. As is generally known in the art, any label material may be used. In one preferred structure, the generally elongated strip of label material is paper. The generally elongated strip of label material 54 is delineated into a first end portion 60, a center portion 62 and a second end portion 64. The center portion 62 is situated between the first end portion 60 and the second end portion 64. A plurality of lines of perforations 66 extend across the width of the first end portion 60 where the first end portion 60 lies adjacent the center portion 62 and across the width of the second end portion 64 where the second end portion 64 lies adjacent the center portion 62. Alternatively, the plurality of lines of perforations 66 extend across the width of either the first end portion 60 where the first end portion

Figure 12:
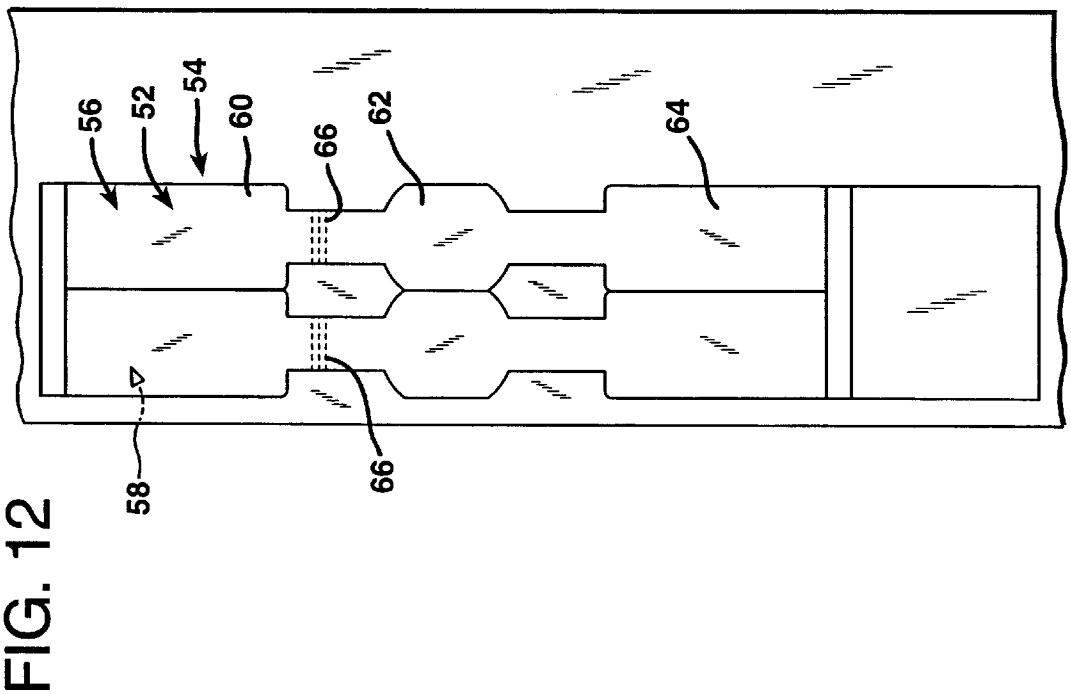
FIG. 12 is a plan view of a security label embodying another preferred embodiment of the present invention.
Figure 13:
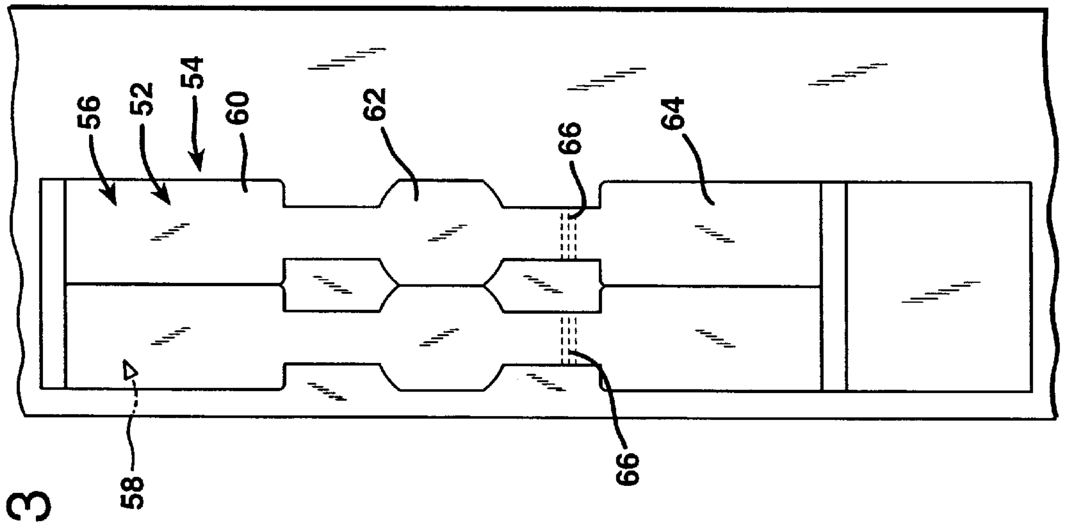
FIG. 13 is a plan view of a security label embodying another preferred embodiment of the present invention.

60 lies adjacent the center portion 62 (See FIG. 12) or across the width of the second end portion 64 where the second end portion 64 lies adjacent the center portion 62 (See FIG. 13). In one preferred structure, a coating of adhesive 68 (See FIG. 14) is applied to the second surface 58 of the generally elongated strip of label material 54. The adhesive 68 is preferably a pressure sensitive adhesive suitable for adhering the second surface 58 of the generally elongated strip of label material 54. In another preferred structure, a coating of adhesive 68 (See FIG. 15) is not present in the area defined by the lines of perforations 66, thereby defining a no adhesive zone 69.

Figure 14:
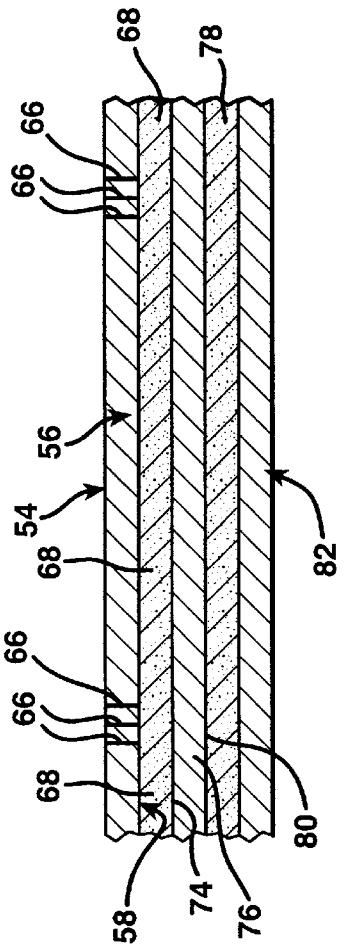
FIG. 14 is a cross-sectional view taken along lines 14—14 of FIG. 11.
Figure 15:
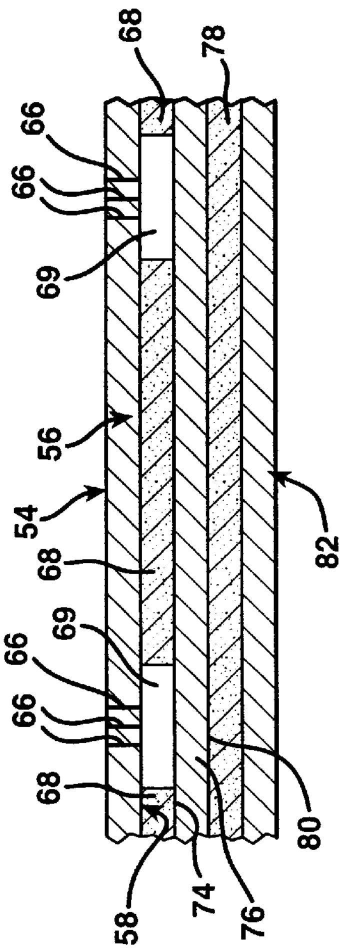
FIG. 15 is a cross-sectional view taken along lines 14—14 of FIG. 11, with a zone of no adhesive in the area defined by the lines of perforations.

Referring now to FIG. 11, the generally elongated strip of label material 54 is die cut along its length, thereby defining the pair of generally elongated security labels 52. The generally elongated strip of label material 54 is die cut across its width, thereby defining a generally rectangular security label 70. A die cut 72 is provided on the generally rectangular security label. The generally rectangular security label 70 is substantially wider than a single, generally elongated security label 52. As is illustrated in FIGS. 14 and 15, the second surface 58 of the generally elongated strip of label material 54 is removably adhered to the first surface 74 of a release liner 76 with a coating of adhesive 68. A second coating of adhesive 78 adheres the second surface 80 of the release liner 76 to a business form 82.

Looking back at FIG. 11, a plurality of slits 84 are cut into the first end portion 60 and the second end portion 64 of the generally elongated strip of label material 54. The center portion 62 of the generally elongated strip of label material 54 is die cut to be somewhat rounded, although having straight parallel edges along its length 86. This shape 86 generally corresponds to the shape of a lid for a specimen container. The width of area 88 directly adjacent the first plurality of lines of perforations 66 and the width of area 90 directly adjacent the second plurality of lines of perforations 66 is substantially less than the width of the first end portion 60 and substantially less than the width of the second end portion 64. The width of area 88 directly adjacent said first plurality of lines of perforations 66 and the width of area 90 directly adjacent the second plurality of lines of perforations 66 is less than the width of the center portion 86.

Figure 16:
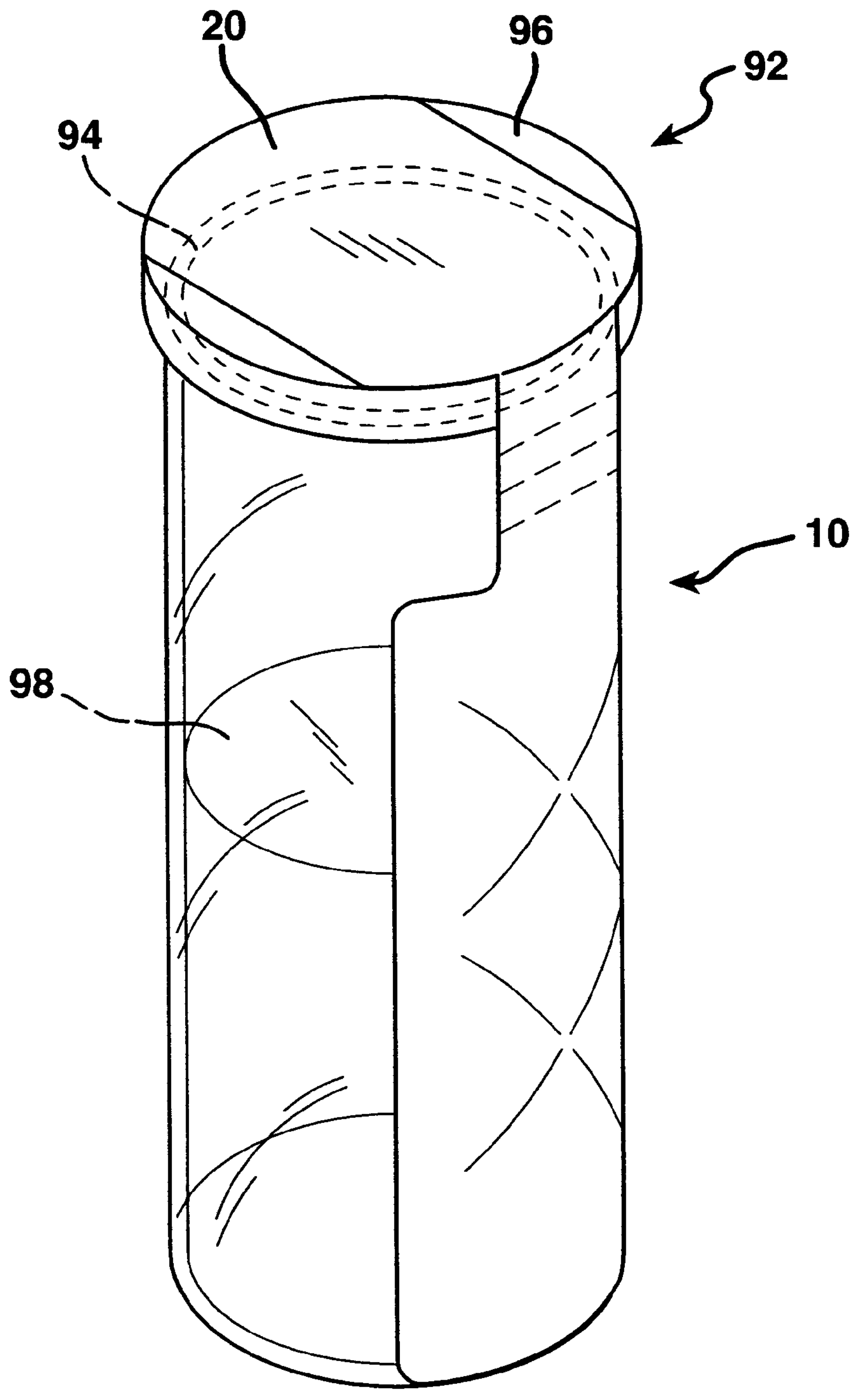
FIG. 16 is a plan view of a method of securing a specimen container.

A method of securing a specimen container is depicted in FIG. 16. A specimen container 92 is provided defining a container mouth 94 and a container lid 96. After the specimen container is filled with a specimen 98, such as urine, the container lid 96 is engaged to the container mouth 94 so that the container is in a closed position. The security label 10 is adhered to the specimen container 92 such that the center portion 20 of the security label 10 is aligned with the container lid 96.

We claim:

1. A security device comprising:

a container having a container body and a lid; and, a security label, said security label comprising:

a generally elongate strip of label material having a first surface, a second surface, a first end portion, a center portion, and a second end portion, said first end portion separated from said center portion by a first area having a width substantially less than the width of said first end portion, and said second end portion separated from said center portion by a second area having a width substantially less than the width of said second end portion;

a first plurality of transverse lines of perforation across said first area; and, a coating of adhesive applied to said second surface such that said coating of adhesive defines a first adhesive free zone in the area defined by said first plurality of transverse lines of perforations, wherein said security label is secured to said container such that said center portion overlies and adheres to said lid, said first and second portions adhere to opposite sides of said container body, and said first plurality of transverse lines of perforation are adjacent to said lid.

2. A security device comprising:

a container having a container body and a lid; and, a security label, said security label comprising:

a generally elongate strip of label material having a first surface, a second surface, a first end portion, a center portion, and a second end portion, said first end portion separated from said center portion by a first area having a width less than the width of said first end portion, and said second end portion is separated from said center portion by a second area having a width less than the width of said second end portion;

a first plurality of transverse lines of perforation across said first area; and, a coating of adhesive applied to said second surface such that said coating of adhesive defines a first adhesive free zone in the area defined by said first plurality of transverse lines of perforations, wherein said security label is secured to said container such that said center portion overlies and adheres to said lid, said first and second portions adhere to opposite sides of said container body, and said first plurality of transverse lines of perforation are positioned such that said container can be opened without the need to apply a substantially greater force than would be exerted to open said container without said security label affixed thereto.

3. A security device comprising:

a container having a container body and a lid; and, a security label, said security label comprising:

a generally elongated strip of label material having a first surface, and a second surface, said generally elongated strip of label material delineated into a first end portion, a center portion, and a second end portion, said center portion situated between said first end portion and said second end portion, wherein said security label is applied across said lid and opposite sides of said container; and a first plurality of transverse lines of perforation dividing said first end portion from said center portion, said first plurality of transverse lines of perforation arranged on said generally elongate strip such that when said security label is applied across said lid and opposite sides of said container, said first plurality of transverse lines of perforation are adjacent to the periphery of said lid.

4. A security device comprising:

a container having a container body and a lid; and, a security label, said security label comprising:

a generally elongated strip of label material having a first surface, and a second surface, said generally elongated strip of label material delineated into a first end portion, a center portion, and a second end portion, said center portion situated between said first end portion and said second end portion, wherein said center portion is applied to said lid and said first and second end portions are applied to opposite sides of said container body;

a first plurality of transverse lines of perforation dividing said first end portion from said center portion, said first plurality of transverse lines of perforation arranged on said generally elongate strip such that when said security label is applied across said lid and opposite sides of said container, said first plurality of transverse lines of perforation are adjacent to the periphery of said lid; and, a second plurality of transverse lines of perforation dividing said second end portion from said center portion, said second plurality of transverse lines of perforation arranged on said generally elongate strip such that when said security label is applied across said lid and opposite sides of said specimen container, said second plurality of transverse lines of perforation are adjacent to the periphery of said lid.

* * * * *

UNITED STATES PATENT AND TRADEMARK OFFICE

CERTIFICATE OF CORRECTION

PATENT NO. : 6,276,725 B1
DATED : August 21, 2001
INVENTOR(S) : Laurash et al.

It is certified that error appears in the above-identified patent and that said Letters Patent is hereby corrected as shown below:

<u>Column 2,</u>
Line 3, reads as "BACKGROUND ART" should read -- 3. Background Art --.

<u>Column 4,</u>
Line 60, reads as "potion or acorss", should read -- portion or across --.

Signed and Sealed this

Thirtieth Day of April, 2002

*Attest:*

JAMES E. ROGAN

*Attesting Officer*

*Director of the United States Patent and Trademark Office*